(12) United States Patent
Gauthier et al.

(10) Patent No.: US 6,909,203 B2
(45) Date of Patent: Jun. 21, 2005

(54) I/O INTERFACE ANTI-RESONANCE PASSBAND SHUNTING TECHNIQUE

(75) Inventors: Claude Gauthier, Cupertino, CA (US); Brian Amick, Austin, TX (US); Aninda Roy, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 10/356,905

(22) Filed: Feb. 3, 2003

(65) Prior Publication Data

US 2004/0150924 A1 Aug. 5, 2004

(51) Int. Cl.$^7$ ............................................... A01H 79/00
(52) U.S. Cl. ...................... 307/100; 307/102; 307/327; 307/30; 307/105
(58) Field of Search .............................. 326/30; 307/30, 307/327

(56) References Cited

U.S. PATENT DOCUMENTS

| | | | |
|---|---|---|---|
| 6,198,325 B1 * | 3/2001 | Ang et al. | 327/259 |
| 6,429,722 B1 | 8/2002 | Amick et al. | |
| 6,441,640 B1 * | 8/2002 | Gauthier et al. | 326/30 |
| 6,456,107 B1 | 9/2002 | Gauthier et al. | |
| 6,462,604 B1 | 10/2002 | Amick et al. | |
| 6,476,663 B1 | 11/2002 | Gauthier et al. | |
| 6,483,341 B2 * | 11/2002 | Gauthier et al. | 326/30 |
| 6,556,041 B1 | 4/2003 | Gauthier et al. | |
| 6,639,439 B2 | 4/2003 | Gauthier et al. | |
| 6,618,277 B2 | 9/2003 | Gauthier et al. | |
| 6,700,390 B2 | 3/2004 | Gauthier et al. | |
| 6,701,488 B2 | 3/2004 | Amick et al. | |

OTHER PUBLICATIONS

U.S. Appl. No. 09/930,373, filed Aug. 14, 2001, Gauthier et al.
U.S. Appl. No. 09/930,030, filed Aug. 14, 2001, Gauthier et al.
U.S. Appl. No. 10/118,840, filed Apr. 9, 2002, Gauthier et al.
U.S. Appl. No. 10/277,302, filed Oct. 22, 2002, Gauthier et al.
U.S. Appl. No. 10/274,165, filed Oct. 18, 2002, Guathier et al.
U.S. Appl. No. 10/328,069, filed Dec. 23, 2002, Gauthier et al.
U.S. Appl. No. 10/370,901, filed Feb. 20, 2003, Gauthier et al.

* cited by examiner

Primary Examiner—Robert DeBeradinis
(74) Attorney, Agent, or Firm—Osha & May L.L.P.

(57) ABSTRACT

A method and apparatus for regulating resonance in a computer system I/O interface is provided. A shunting impedance/resistance is arranged across a power supply of the I/O interface. The shunting impedance/resistance is controlled by circuitry that is arranged to detect voltage overshoot conditions in the I/O interface. The circuitry has (1) an analog front end that is arranged to detect power supply oscillations relative to a grounded terminal, (2) an amplifier (or logic conversion circuit) that is arranged to convert an output signal from the analog front end to a digital signal, and (3) a shunting apparatus arranged to modify power supply behavior in the I/O interface dependent on the digital signal.

15 Claims, 2 Drawing Sheets

I/O INTERFACE ANTI-RESONANCE PASSBAND SHUNTING TECHNIQUE

BACKGROUND OF INVENTION

As input/output (I/O) interface speeds increase, I/O circuitry becomes more sensitive to the effects of parasitic inductances. Such parasitic inductances can result from sources such as bond wires, IC package leads, external supply lines that provide operating power, etc. The problem with parasitic inductances is that they cause very high supply line impedances to develop at the resonance frequency of a particular circuit. This may lead to circuit oscillation 10 as is shown in FIG. 1. Such I/O power supply oscillations degrade the timing and reliability of an I/O interface. In order to avoid such undesirable effects on I/O operation and function, parasitic inductances must be suitably compensated for and/or controlled.

One typical method of controlling parasitic inductance involves connecting a capacitor between power supply leads. Such a connection provides a passive bypass that decreases supply line oscillations resulting from external inductances. However, such a connection does not significantly reduce supply line oscillations caused by internal inductances. To this end, another typical method involves connecting an on-chip capacitor between the internal power supply leads. In such an arrangement, the capacitor acts as a bypass in the same manner as the capacitor connected externally. The resulting non-oscillating circuit performance 20 is shown in FIG. 2. However, in order to be effective, the internal capacitor must be very large. This has the drawback of occupying a significant portion of the chip area. Consequently, this method is generally undesirable when minimization of die area is of concern.

Another prior art approach involves increasing the amount of charge stored or delivered to a given amount of added on-chip capacitance by actively increasing the voltage variation across the terminals of such a capacitance. FIG. 3 shows an I/O interface 30 that uses this technique. The I/O interface 30 includes mutually exclusive switches that configure capacitors 32 and 34 to either be in a charging phase (configured as a shunt across I/O $V_{DD}$ 36 and I/O $V_{SS}$ 38) or in a discharging phase (configured in serried with I/O $V_{DD}$ 36 and I/O $V_{SS}$ 38). The I/O interface 30 has two stages: an average voltage potential ($V_{ave}$) tracking stage 40 and an instantaneous voltage potential ($V_{inst}$) tracking stage 42. The mutually exclusive switches are driven by drivers 44 and 46. Each driver 44 and 46 provides two outputs with enough voltage offset to ensure minimal leakage through both charge and discharging switches during switching activity.

Instantaneous voltage supply variation is monitored by coupling I/O $V_{DD}$ 36 and I/O $V_{SS}$ 38 onto inputs of driver 46, where driver 46 is dynamically biased about the average voltage potential. The average voltage potential is a high-pass filtered version of the local (I/O $V_{DD}$ 36–I/O $V_{SS}$ 38)/2; its low frequency cutoff clears the low end of the resonance range and it also rejects the tracking of low-frequency disturbances that result from non-resonance behavior. The coupled instantaneous voltage potential feeds a feedback loop of the I/O interface 30 as charge is pumped in and out of the switched capacitors 32 and 34 that are coupled to the I/O power supply grid in an attempt to overcome I/O voltage variations, i.e., I/O power supply oscillations. The compensated high frequency cutoff ensures stable loop response while also clearing the high end of the resonance range.

FIG. 4 shows modeled circuit behavior associated with the I/O interface design shown in FIG. 3. In FIG. 4, fully charged capacitors 32 and 34 (of equal value in this implementation) are stacked in series 33 across the I/O power supply grid, i.e., in between I/O $V_{DD}$ 36 and I/O $V_{SS}$ 38. In this arrangement, the capacitors 32 and 34 serve as a voltage multiplier for the I/O power supply grid. The depleted voltage in each capacitor 32 and 34 is I/O $V_{DD}$/n, where n is the number of capacitor stacks. Conversely, the stacked capacitors 32 and 34 store charge from the I/O power supply grid until the terminals across the capacitors 32 and 34 are at I/O $V_{DD}$ 36.

A capacitance amplification factor, G, represents the charge supplied to the I/O power supply grid by the switched capacitors 32 and 34 normalized to the charge furnished by regular decoupled capacitors given the same supply voltage variation. The amplification can be expressed as $G=(k+n-1)/(k*n^2)$, where n is the number of capacitor stacks and k is the voltage regulation tolerance. With each capacitor having a value C, the equivalent unstacked capacitance of $C*n$ is reduced to $C/n$ upon stacking with a total stack voltage of I/O $V_{DD}$ $34*n$.

As shown in FIG. 4, when the instantaneous voltage potential falls below the average voltage potential, the capacitors 32 and 34 are switched to an arrangement in which discharging occurs, thereby providing charge to the I/O power supply grid. Alternatively, when the average voltage potential falls below the instantaneous voltage potential, the capacitors 32 and 34 are switched to an arrangement in which charging occurs, thereby drawing charge from the I/O power supply grid.

FIG. 5 shows the operation of the I/O interface 30 shown in FIG. 3 in conjunction with the discussion above with reference to FIG. 4. Specifically, FIG. 5 shows (1) a steady state when the average voltage potential is equal to the instantaneous voltage potential, (2) a discharging phase when the instantaneous voltage potential is less than the average voltage potential, and (3) a charging phase when the instantaneous voltage potential is greater than the average voltage potential. The high frequency and low frequency cutoffs are also shown for their respective phases.

While the method of using stacked capacitors has been demonstrated to be effective in minimizing the effect of parasitic inductance, space is at a premium in I/O interface design. Any design that obtains the same or better performance while reducing the required area on the I/O interface yields significant cost and design benefits.

SUMMARY OF INVENTION

According to one aspect of the present invention, a computer system having an I/O interface comprises: a supply voltage line operatively connected to the I/O interface; a ground voltage line operatively connected to the I/O interface; and a passband shunt regulator operatively connected to the supply voltage line and the ground voltage line, where the passband shunt regulator is connected in parallel with a capacitance disposed across the supply voltage line and the ground voltage line.

According to another aspect, an I/O interface having a power supply terminal and a ground terminal comprises an analog stage arranged to output an analog signal dependent on power supply oscillations in the I/O interface, an amplifier stage arranged to output a digital signal dependent on the analog signal, and a shunting stage operatively connected to the amplifier stage and arranged to short the power supply terminal and the ground terminal dependent on the digital signal.

According to another aspect, an apparatus for regulating resonance in an I/O interface comprises means for providing a power supply voltage, means for providing a ground voltage, and means for resistively shorting the means for providing the power supply voltage and the means for providing the ground voltage at a particular resonant frequency of the I/O interface.

According to another aspect, A method for regulating power supply oscillations in an I/O interface comprises: supplying a power supply voltage to the I/O interface; supplying a ground voltage to the I/O interface; tracking an average voltage potential of the I/O interface; tracking an instantaneous voltage potential of the I/O interface; and shorting the power supply voltage and the ground voltage dependent on the average voltage potential and the instantaneous voltage potential.

Other aspects and advantages of the invention will be apparent from the following description and the appended claims.

DETAILED DESCRIPTION

Embodiments of the present invention relate to a method and apparatus for regulating resonance in a computer system I/O interface. In order to regulate resonance, a shunting impedance/resistance is arranged across a power supply of the I/O interface. The shunting resistance/impedance is controlled by circuitry that is arranged to detect voltage overshoot conditions in the I/O interface.

The present invention uses I/O circuitry having (1) an analog front end that is arranged to detect power supply oscillations relative to a grounded terminal, (2) an amplifier (or logic conversion circuit) that is arranged to convert an output signal from the analog front end to a digital signal, and (3) a shunting apparatus arranged to modify power supply behavior in the I/O interface dependent on the digital signal.

Figure 1:
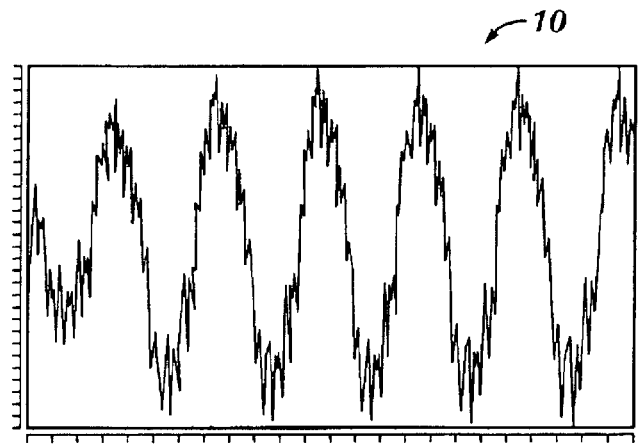
FIG. 1 shows a graph of an oscillating circuit.
Figure 2:
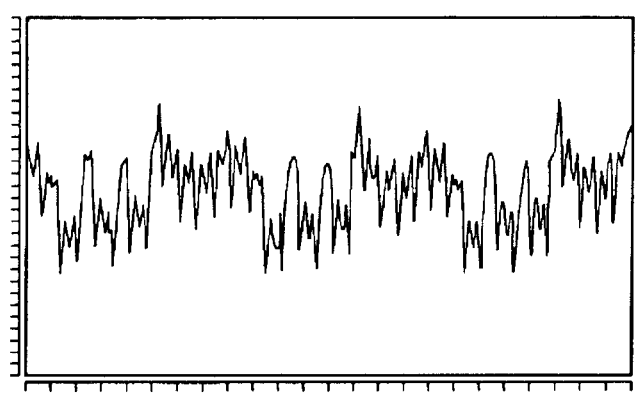
FIG. 2 shows a graph of a non-oscillating circuit.
Figure 3:
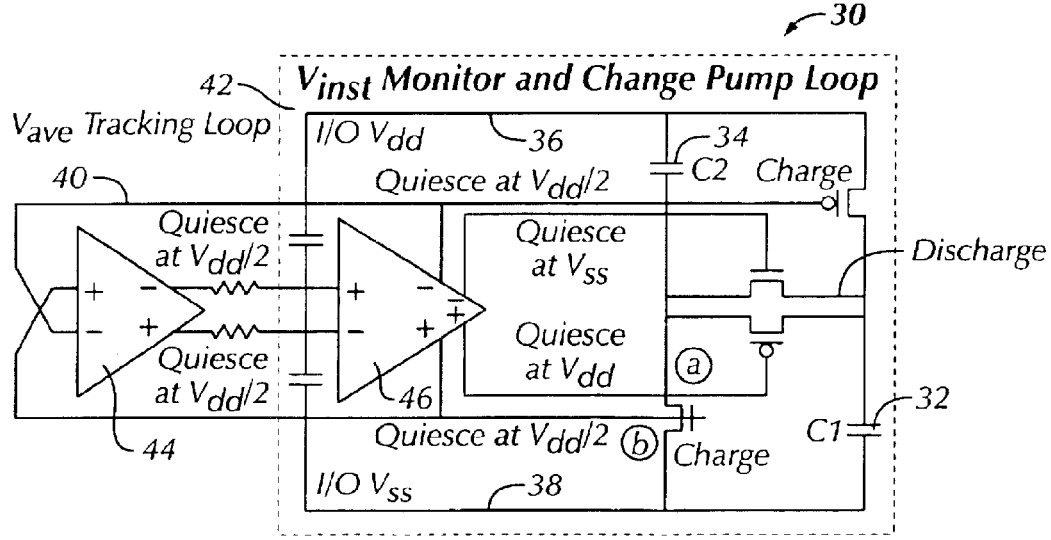
FIG. 3 shows a typical I/O resonance regulation design.
Figure 4:
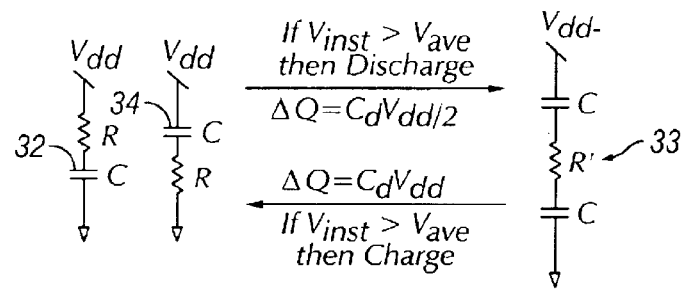
FIG. 4 shows circuit behavior associated with the design shown in FIG. 3.
Figure 5:
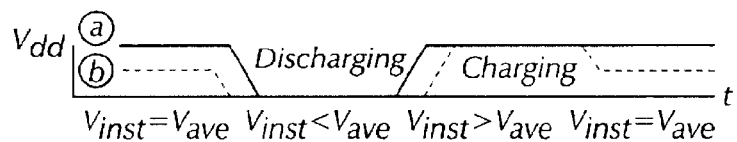
FIG. 5 shows a graph of charging and discharging cycles associated with the design shown in FIG. 3.
Figure 6:
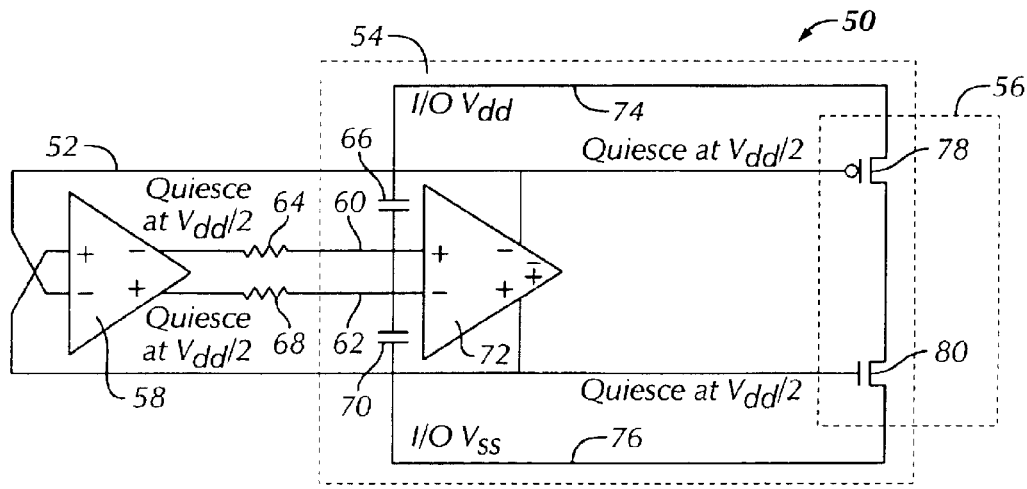
FIG. 6 shows an I/O interface in accordance with an embodiment of the present invention.

FIG. 6 shows a portion of an exemplary I/O interface 50 in accordance with an embodiment of the present invention. As shown, the I/O interface 50 includes an analog stage 52, an amplifier stage 54, and a shunting stage 56.

The analog stage 52 involves the effective tracking/monitoring of an average voltage potential of the I/O interface 50. To this end, the analog stage 52 uses a bias generator 58 that is biased about the average voltage potential. The average voltage potential is the difference between a voltage potential on line 60 and a voltage potential on line 62. Moreover, due to the arrangement of the I/O interface 50 as shown in FIG. 6, the average voltage potential is a high-pass filtered version of (I/O $V_{DD}$ 74–I/O $V_{SS}$ 76)/2 delivered through high-pass filters formed by (1) resistor 64 and capacitor 66 and (2) resistor 68 and capacitor 70. The low frequency cutoff of the high-pass filters is below the resonant frequency of the parasitic tank circuit of the I/O interface 50. Additionally, the high-pass filters reject the tracking of low-frequency disturbances that are not caused by resonance.

The amplifier stage 54 involves the effective tracking/monitoring of an instantaneous voltage potential of the I/O interface 50. The amplifier stage 54 uses an operational amplifier as a comparator 72 to track/monitor the instantaneous voltage potential. This is achieved by connections of I/O $V_{DD}$ 74 and I/O $V_{SS}$ 76 to inputs of the comparator 72. As shown in FIG. 6, the comparator 72 is dynamically biased by the bias generator 58. Accordingly, dependent on the bias generator 58 and I/O $V_{DD}$ 74 and I/O $V_{SS}$ 76, the comparator 72 provides a set of complementary outputs that serve as (1) feedback to inputs of the bias generator 58 and (2) signals to the shunting stage 56.

The arrangement and characteristics of the elements, e.g., bias generator 58 and comparator 72, in the analog and amplifier stages 52 and 54 are set such that at a particular resonance frequency of the I/O interface 50, the comparator 72 outputs signals to the shunting stage 56 that cause the shunting stage 56 to short I/O $V_{DD}$ 74 and I/O $V_{SS}$ 76. As shown in FIG. 6, the shunting stage 56 includes a shunting regulator formed by transistors 78 and 80 that each have inputs respectively and operatively connected to the outputs of the comparator 72. At a certain resonance frequency, the comparator 72, via its complementary outputs, causes transistors 78 and 80 to switch 'on' (i.e., conduct current between terminals), which, in turn, causes the resistive shorting of I/O $V_{DD}$ 74 and I/O $V_{SS}$ 76. Once the shunting regulator shorts I/O $V_{DD}$ 74 and I/O $V_{SS}$ 76, the shunting regulator effectively acts as a damping resistance and consequently reduces the power supply resonance effect on the I/O interface 50. Those skilled in the art will note that the configuration of the shunting stage 56 as shown in FIG. 6 is effectively a passband shunt regulator.

In order for precise switching of the transistors 78 and 80, the outputs from the comparator 72 may be digital. However, in other embodiments, in which precise switching of the transistors 78 and 80 is not as important from a timing perspective, the outputs from the comparator 72 may be more analog in nature.

Those skilled in the art will note that, in other embodiments, multiple shunting regulators may be used according to design criteria of the I/O interface. Moreover, those skilled in the art will note that other embodiments that are not shown, yet that are within the scope of the present invention, exist in which an I/O supply voltage line and an I/O ground voltage line may be shorted in response to I/O interface power supply resonance.

Advantages of the present invention may include one or more of the following. In one or more embodiments, because a passband shunt apparatus is used to regulate power supply resonance in an I/O interface, die size and cost may be reduced.

In one or more embodiments, because an I/O interface includes a passband shunt apparatus to regulate resonance, I/O performance may be improved.

In one or more embodiments, because a passband shunt regulator is used to selectively damp an I/O power supply, overall bit error rate in I/O operations may be decreased.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer system having an I/O interface, comprising:

a supply voltage line operatively connected to the I/O interface;

a ground voltage line operatively connected to the I/O interface; and a passband shunt regulator operatively connected to the supply voltage line and the ground voltage line, wherein the passband shunt regulator is connected in parallel with a capacitance disposed across the supply voltage line and the ground voltage line.

2. The computer system of claim 1, wherein the passband shunt regulator is arranged to short the supply voltage line and the ground voltage line dependent on a voltage in the I/O interface overshooting in response to a resonance condition of the I/O interface.

3. The computer system of claim 1, the passband shunt regulator comprising at least one transistor operatively connected to the supply voltage line and the ground voltage line.

4. The computer system of claim 1, further comprising:

another passband shunt regulator operatively connected to the supply voltage line and the ground voltage line, wherein the another passband shunt regulator is connected in parallel with the capacitance.

5. An I/O interface having a power supply terminal and a ground terminal, comprising:

an analog stage arranged to output an analog signal dependent on power supply oscillations in the I/O interface;

an amplifier stage arranged to output a digital signal dependent on the analog signal; and a shunting stage operatively connected to the amplifier stage and arranged to short the power supply terminal and the ground terminal dependent on the digital signal.

6. The I/O interface of claim 5, the analog stage comprising:

a bias generator arranged to output the analog signal dependent on an average voltage potential of the I/O interface.

7. The I/O interface of claim 6, wherein the bias generator is arranged to input the digital signal.

8. The I/O interface of claim 5, the amplifier stage comprising:

a comparator operatively connected to the power supply terminal and the ground terminal and arranged to output the digital signal dependent on an instantaneous voltage potential of the I/O interface.

9. The I/O interface of claim 5, the shunting stage comprising:

at least one transistor arranged to input the digital signal, wherein the at least one transistor is operatively connected between the power supply terminal and the ground terminal.

10. An apparatus for regulating resonance in an I/O interface, comprising:

means for providing a power supply voltage;

means for providing a ground voltage; and means for resistively shorting the means for providing the power supply voltage and the means for providing the ground voltage at a particular resonant frequency of the I/O interface.

11. The apparatus of claim 10, further comprising:

means for outputting an analog signal dependent on an average voltage potential of the I/O interface; and means for outputting a digital signal dependent on an instantaneous voltage potential of the I/O interface, wherein the means for resistively shorting is dependent on the digital signal.

12. A method for regulating power supply oscillations in an I/O interface, comprising:

supplying a power supply voltage to the I/O interface;

supplying a ground voltage to the I/O interface;

tracking an average voltage potential of the I/O interface;

tracking an instantaneous voltage potential of the I/O interface; and shorting the power supply voltage and the ground voltage dependent on the average voltage potential and the instantaneous voltage potential.

13. The method of claim 12, further comprising:

outputting a first signal dependent on the average voltage potential of the I/O interface; and outputting a second signal dependent on the instantaneous voltage potential of the I/O interface, wherein the shorting is dependent on the second signal.

14. The method of claim 13, wherein outputting the first signal is dependent on the second signal.

15. The method of claim 13, wherein outputting the second signal is dependent on the first signal.

* * * * *